(12) United States Patent
Fang

(10) Patent No.: US 7,986,392 B2
(45) Date of Patent: Jul. 26, 2011

(54) LIQUID CRYSTAL DISPLAY WITH DEFORMABLE FIXING MEMBER AND COOPERATIVE BLOCKING MEMBER

(75) Inventor: Chien-Chung Fang, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 589 days.

(21) Appl. No.: 12/148,673

(22) Filed: Apr. 21, 2008

(65) Prior Publication Data
US 2008/0259239 A1 Oct. 23, 2008

(30) Foreign Application Priority Data

Apr. 20, 2007 (CN) .................. 2007 2 0119655 U

(51) Int. Cl.
*G02F 1/1345* (2006.01)
*G02F 1/1333* (2006.01)
*F21V 21/00* (2006.01)
*F21V 15/00* (2006.01)

(52) U.S. Cl. .......... 349/150; 349/58; 349/149; 349/151; 349/152; 362/217.11; 362/217.14; 362/362

(58) Field of Classification Search .............. 349/58, 349/149–152; 345/90, 104; 362/271.1, 271.11–271.15, 362–371
See application file for complete search history.

(56) References Cited

U.S. PATENT DOCUMENTS

| 6,342,932 | B1 * | 1/2002 | Terao et al. ..................... 349/58 |
| 6,661,647 | B2 * | 12/2003 | Kirchhevel et al. ........ 361/679.3 |
| 7,101,232 | B2 | 9/2006 | Shimizu |
| 7,230,659 | B2 * | 6/2007 | Ha et al. ......................... 349/58 |
| 2006/0244891 | A1 * | 11/2006 | Tsubokura et al. ........... 349/150 |

FOREIGN PATENT DOCUMENTS

JP 2004087910 A * 3/2004

* cited by examiner

Primary Examiner — Hoan C Nguyen
(74) Attorney, Agent, or Firm — Wei Te Chung

(57) ABSTRACT

An exemplary liquid crystal display includes a printed circuit and a bottom tray. The printed circuit board defines a plurality of through holes therein. The bottom wall includes a plurality of deformable fixing members and blocking members respectively extending from the bottom wall. Each deformable fixing member includes a protrusion extending through a respective one of the through holes of the printed circuit board, engagement of the protrusions in the through holes blocks movement of the printed circuit board in directions parallel to the bottom wall. The blocking members hold edge portions of the printed circuit board and block movement of the printed circuit board in a direction away from the bottom wall. The printed circuit board is secured to the bottom tray by cooperation of the deformable fixing members and the blocking members.

20 Claims, 5 Drawing Sheets

LIQUID CRYSTAL DISPLAY WITH DEFORMABLE FIXING MEMBER AND COOPERATIVE BLOCKING MEMBER

CROSS-REFERENCE TO RELATED APPLICATION

This application is related to, and claims the benefit of, a foreign priority application filed in China as Serial No. 200720119655.6 on Apr. 20, 2007. The related application is incorporated herein by reference.

FIELD OF THE INVENTION

The present invention relates to a liquid crystal display (LCD) that typically includes a plurality of deformable fixing members and corresponding blocking members, which enable a printed circuit board (PCB) to be conveniently secured to the LCD or removed from the LCD.

GENERAL BACKGROUND

Recently, liquid crystal displays that are light and thin and have low power consumption characteristics have been widely used in office automation equipment, video units, and the like.

Referring to FIG. 7, a typical liquid crystal display 1 includes a top bezel 11, a liquid crystal panel 12, a PCB 13, a flexible printed circuit board (FPCB) 14, a backlight module 15, and a bottom tray 16. When the liquid crystal display 1 is assembled, the top bezel 11 and the bottom tray 16 cooperatively accommodate the liquid crystal panel 12 and the backlight module 15. The FPCB 14 interconnects the liquid crystal panel 12 and the PCB 13, and the PCB 13 is secured to the bottom tray 16. The PCB 13 includes four through holes 131 defined therein. The bottom tray 16 includes four threaded holes 161 defined in a bottom wall (not labeled) thereof, which threaded holes 161 respectively correspond to the through holes 131 of the PCB 13.

In a process of assembly of the liquid crystal display 1, the through holes 131 of the PCB 13 are aligned with the threaded holes 161 of the bottom tray 16, respectively. Four screws (not labeled) are inserted through the through holes 131 and threadingly engaged in the respective threaded holes 161. Thereby, the PCB 13 is secured to the bottom wall of the bottom tray 16. However, the need for the screws makes the process of securing and removing the PCB 13 inconvenient. Further, the step of threadingly engaging the screws is typically performed by manual labor, and adds to the cost of manufacturing the liquid crystal display 1.

What is needed, therefore, is a liquid crystal display that can overcome the above-described deficiencies.

SUMMARY

In an exemplary embodiment, a liquid crystal display includes a printed circuit and a bottom tray. The printed circuit board defines a plurality of through holes therein. The bottom wall includes a plurality of deformable fixing members and blocking members respectively extending from the bottom wall. Each deformable fixing member includes a protrusion extending through a respective one of the through holes of the printed circuit board, engagement of the protrusions in the through holes blocks movement of the printed circuit board in directions parallel to the bottom wall. The blocking members hold edge portions of the printed circuit board and block movement of the printed circuit board in a direction away from the bottom wall. The printed circuit board is secured to the bottom tray by cooperation of the deformable fixing members and the blocking members.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred and exemplary embodiments of the present invention in detail.

Figure 1:
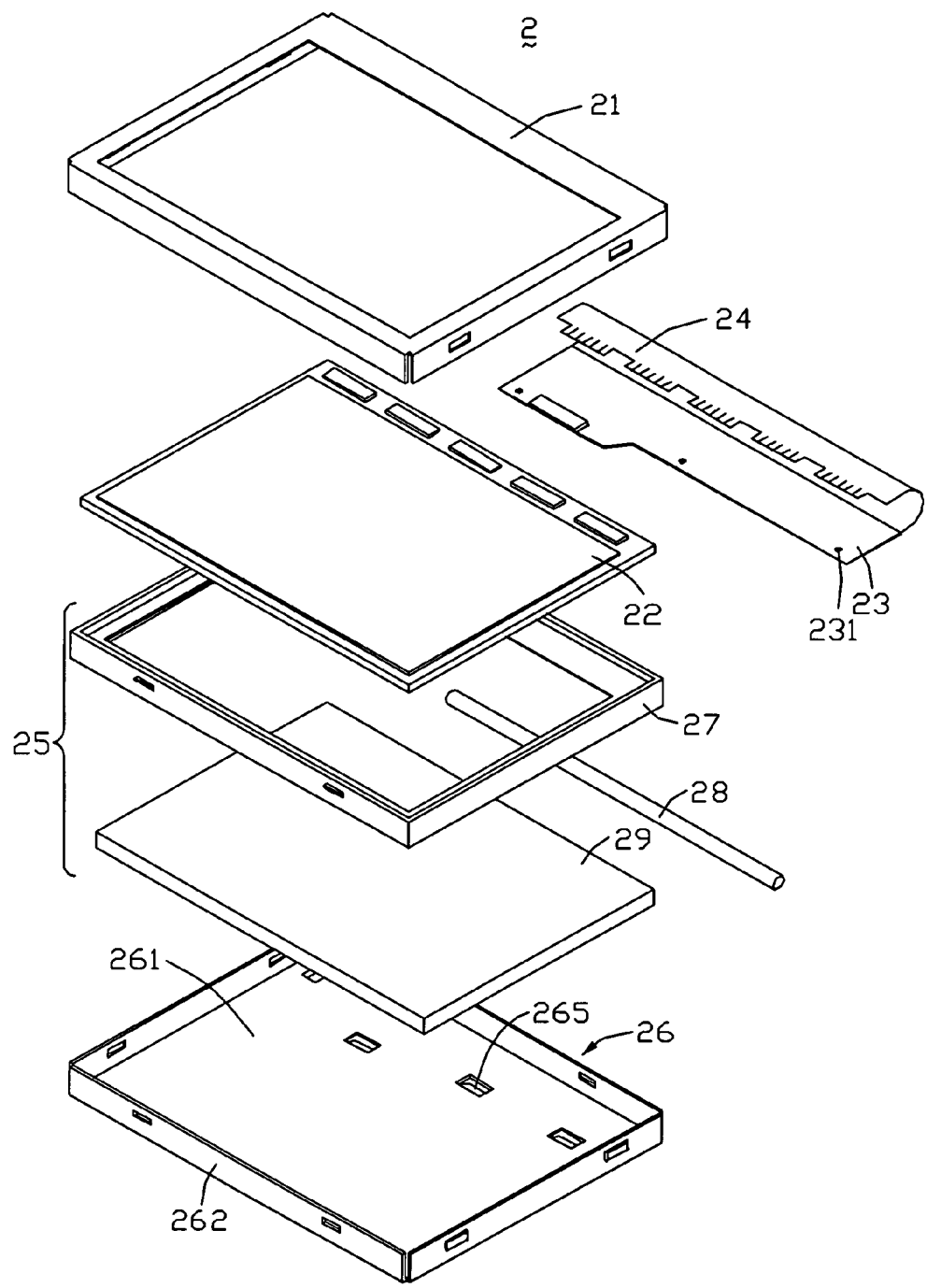
FIG. 1 is an exploded, isometric view of a liquid crystal display according to an exemplary embodiment of the present invention, the liquid crystal display including a PCB and a bottom tray.

Referring to FIG. 1, a liquid crystal display 2 according to an exemplary embodiment of the present invention is shown. The liquid crystal display 2 includes a top bezel 21, a liquid crystal panel 22, a PCB 23, an FPCB 24, a backlight module 25, and a bottom tray 26.

The top bezel 21 has a generally rectangular shape, and has a size which is slightly greater than a size of the liquid crystal panel 22. The top bezel 22 includes a four-sided bezel portion (not labeled), thus defining a window (not labeled) for allowing viewing of the liquid crystal panel 22. The top bezel 21 is preferably made from plastic, polymer, or another suitable material.

The FPCB 24 interconnects the liquid crystal panel 22 and the PCB 23. The PCB 23 includes a plurality of through holes 231 defined therein. In the illustrated embodiment, there are three through holes 231. The through holes 231 are defined at a side of the PCB 23 farthest from the FPCB 24.

The backlight module 25 includes a plastic frame 27, a linear light source 28, and a light guide plate 29. The light guide plate 29 is substantially rectangular. The light source 28 is located adjacent to a vertical thin side edge (not labeled) of the light guide plate 29. The plastic frame 27 supports the liquid crystal panel 22.

Figure 2:
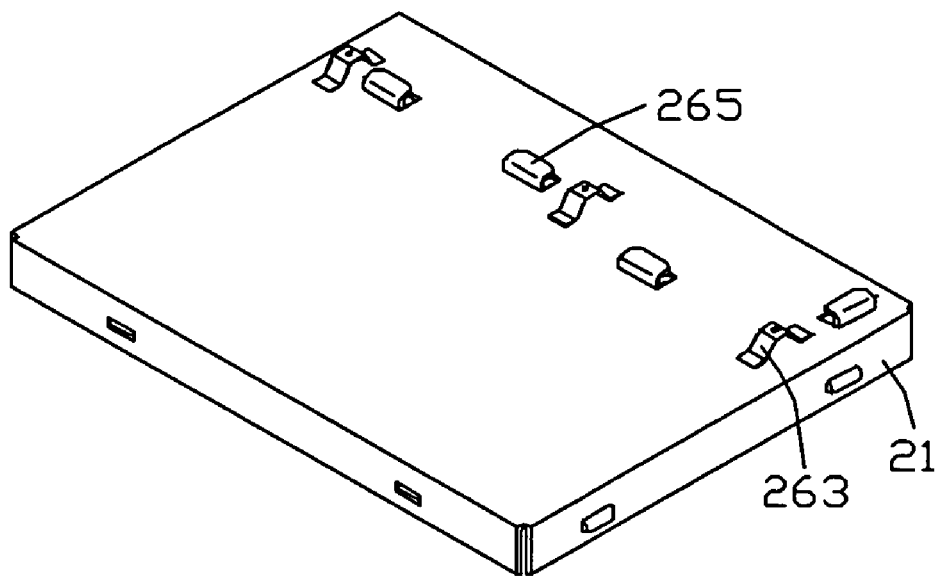
FIG. 2 is an inverted, isometric view of the bottom tray of FIG. 1, the bottom tray including a plurality of deformable fixing members thereat.

Referring also to FIG. 2, the bottom tray 26 includes a bottom wall 261, four side walls 262, a plurality of deformable fixing members 263, and a plurality of blocking members 265. The side walls 262 perpendicularly extend from four edges of the bottom wall 261, respectively. Thereby, the bottom wall 261 and side walls 262 cooperatively define a space (not labeled) for accommodating the light source 28 and the light guide plate 29. In the illustrated embodiment, the side walls 262 are separate from each other. That is, a gap (not labeled) is defined where each two adjacent side walls 262 meet each other at a respective one of four corners (not labeled) of the bottom tray 261. The bottom tray 26 can for example be made from steel, iron, aluminum, magnesium, or any suitable alloy that includes at least one of these metals.

The deformable fixing members 263 and the blocking members 265 outwardly extend from the bottom wall 261 of the bottom tray 26, and are inseparably formed with the bottom wall 261. For example, the deformable fixing members 263 can be welded onto the bottom wall 261, and the blocking members 265 can be stamped from the bottom wall 261. Each blocking member 263 is substantially L-shaped, and includes a location tab (not labeled) extending parallel to the bottom wall 261 of the bottom tray 26. An arrangement of the blocking members 263 corresponds to a shape of the PCB 23. In the illustrated embodiment, there are four blocking members 263. The location tabs of three of the blocking members 263 extending in a first direction, and the location tab of the other blocking member 263 extends in a second direction perpendicular to the first direction. That is, the blocking members 263 are arranged in a substantially L-shaped formation.

Figure 3:
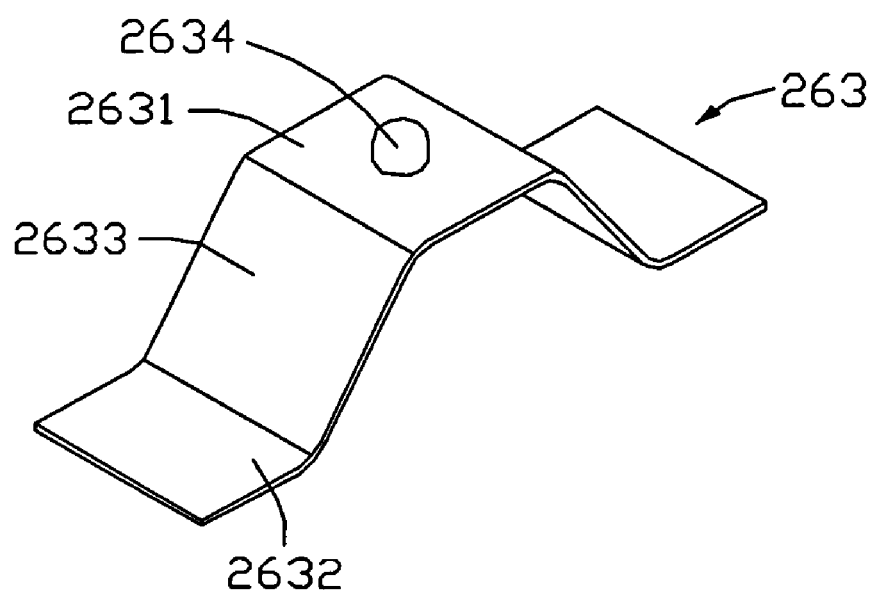
FIG. 3 is an enlarged, isometric view of one of the deformable fixing members of FIG. 2.

Referring also to FIG. 3, each deformable fixing member 263 includes a top plate 2631, two bottom plates 2632, and two side plates 2633. The bottom plates 2632 are respectively arranged at two opposite sides of the top plate 2631, and are parallel to the top plate 2631. Each side plate 2333 interconnects the top plate 2631 and a respective one of the bottom plates 2632, and is inclined relative to the top plate 2331 and the bottom plates 2632. The deformable fixing member 263 further includes a substantially cylindrical protrusion 2634 extending from the top plate 2631 in a direction away from the bottom plates 2633. In the illustrated embodiment, the top plate 2631, the bottom plates 2632, the side plates 2633, and the protrusion 2634 are inseparably formed together. For example, the top plate 2631, the bottom plates 2632, the side plates 2633, and the protrusion 2634 are formed by stamping a single flat plate of material.

Figure 4:
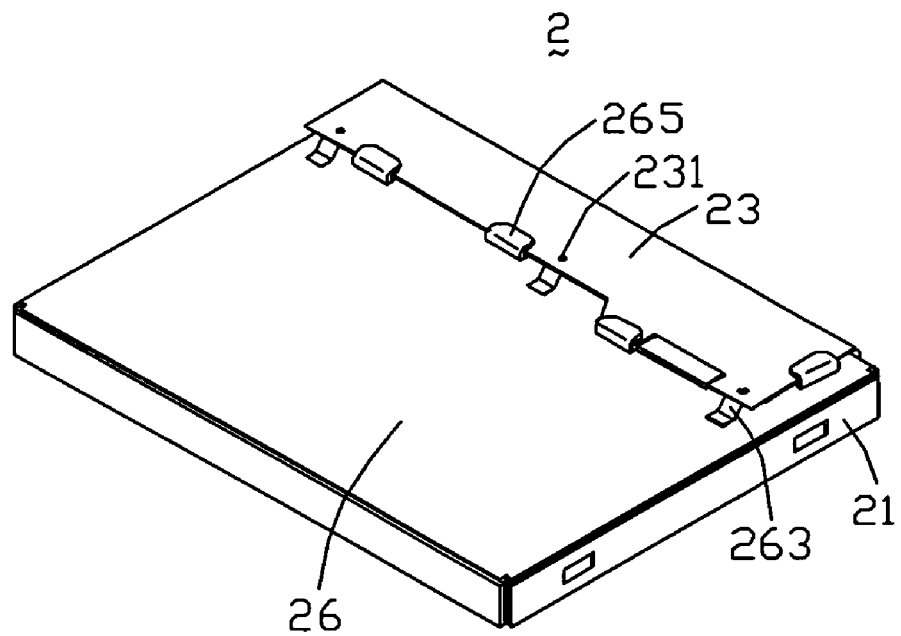
FIG. 4 is an inverted, assembled, isometric view of the liquid crystal display of FIG. 1.
Figure 5:
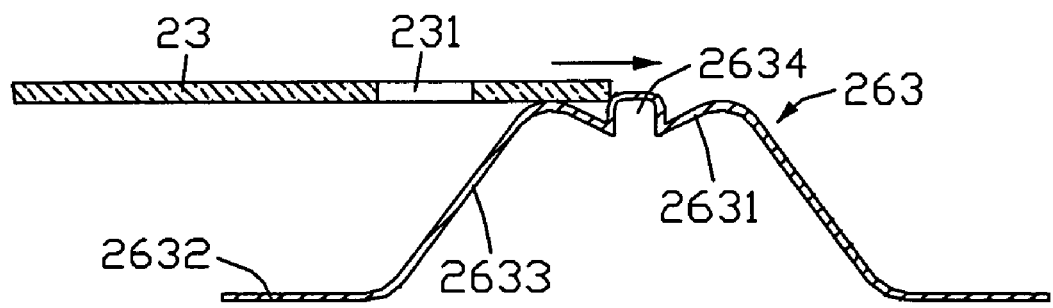
FIG. 5 is an enlarged, side cross-sectional view of the PCB and one of the deformable fixing members of FIG. 4, showing a step in a process of securing the PCB to the deformable fixing member.
Figure 6:
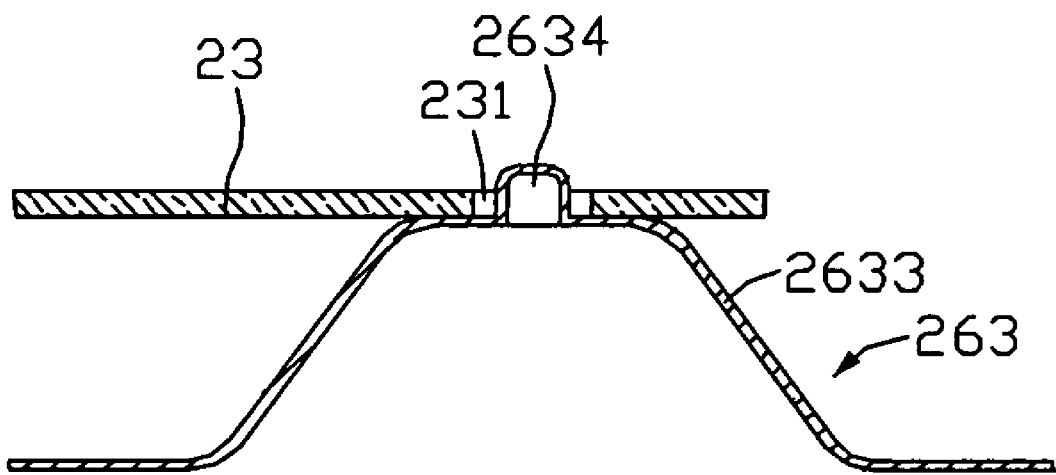
FIG. 6 is similar to FIG. 5, but showing the PCB fully secured to the deformable fixing member.
Figure 7:
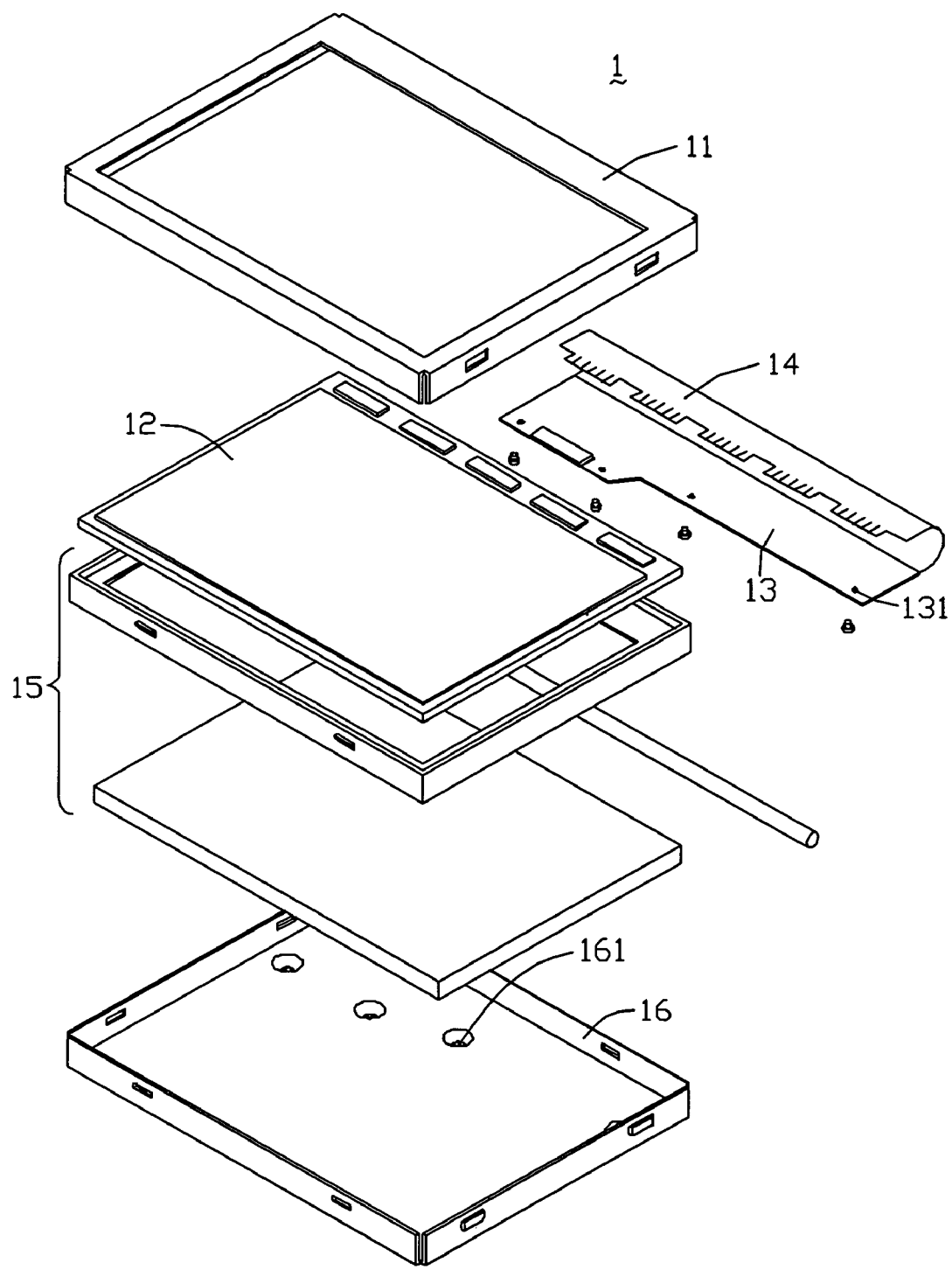
FIG. 7 is an exploded, isometric view of a conventional liquid crystal display.

Referring also to FIG. 4 and FIG. 5, the PCB 23 can be reliably secured to the bottom tray 26 as follows. First, the PCB 23 is positioned adjacent to the blocking members 265. Second, the PCB 23 is pushed so that it is fixed to the deformable fixing members 263. In particular, the top plates 2631 and the side plates 2633 of the deformable fixing members 263 deform when the deformable fixing members 263 are pressed toward the bottom wall 261 by the PCB 23. Thus the protrusions 2634 are pressed downwardly by portions of the PCB 23 which are adjacent to the through holes 231. When the through holes 231 of the PCB 23 become aligned with the protrusions 2634 of the deformable fixing members 263, the deformable fixing members 263 rebound, and the protrusions 2634 of the deformable fixing member 263 extend through the respective through holes 231 of the PCB 23. Thus, the PCB 23 is secured to the bottom tray 26. In particular, movement of the PCB 23 in directions parallel to the bottom wall 261 is blocked by the deformable fixing members 263. In addition, the location tabs of the blocking members 265 fittingly abut the PCB 23, and block movement of the PCB 23 in a direction away from the bottom wall 261. Therefore the PCB 23 is secured to the bottom tray 26 by the cooperation of the deformable fixing members 263 and the blocking members 265.

Detachment of the PCB 23 from the bottom tray 26 is essentially the reverse of the above-described assembly procedure. In particular, the protrusions 2634 or the side walls 2633 of the deformable fixing members 263 are pressed, the deformable fixing members 263 are thereby released from the through holes 231, and the PCB 23 is pulled away from the blocking members 265. In summary, the PCB 23 of the liquid crystal display 2 can be secured to or removed from the bottom tray 26 conveniently. Unlike in conventional art, there is no need for screws.

Further or alternative embodiments may include the following. In one example, the bottom tray may include one, two, four, or more deformable fixing members 263. In another example, the bottom tray may include one, two, three, five, or more blocking members 265.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
   a printed circuit board defining a plurality of through holes therein; and
   a bottom tray comprising:
      a bottom wall;
      a plurality of deformable fixing members extending from the bottom wall, each deformable fixing member comprising a first plate, two second plates, two third plates and a protrusion, the second plates being respectively arranged at two opposite sides of the first plate, each third plate interconnecting the first plate and a respective one of the second plates, the protrusion extending through a respective one of the through holes of the printed circuit board, engagement of the protrusions in the through holes blocking movement of the printed circuit board in directions parallel to the bottom wall; and
      a plurality of blocking members extending from the bottom wall, the plurality of blocking members holding edge portions of the printed circuit board and blocking movement of the printed circuit board in a direction away from the bottom wall, the printed circuit board being secured to the bottom tray by cooperation of the plurality of deformable fixing members and the plurality of blocking members.

2. The liquid crystal display as claimed in claim 1, wherein the plurality of deformable fixing members and the plurality of blocking members outwardly extend from the bottom wall.

3. The liquid crystal display as claimed in claim 1, wherein the plurality of deformable fixing members and the plurality of blocking members are inseparably formed with the bottom wall.

4. The liquid crystal display as claimed in claim 1, wherein an arrangement of the plurality of blocking members corresponds to a shape of the printed circuit board at the edge portions thereof.

5. The liquid crystal display as claimed in claim 1, wherein each blocking member comprises a location tab, and the location tab is substantially parallel to the bottom wall and fittingly abuts the printed circuit board.

6. The liquid crystal display as claimed in claim 1, wherein the third plates are inclined relative to the first plate.

7. The liquid crystal display as claimed in claim 1, wherein the second plates are parallel to the first plate.

8. The liquid crystal display as claimed in claim 1, wherein the protrusion of each deformable fixing member extends from the first plate in a direction away from the second plates.

9. The liquid crystal display as claimed in claim 1, wherein the first plate, the second plates, the third plates, and the protrusion of each deformable fixing member are inseparably formed together.

10. The liquid crystal display as claimed in claim 1, wherein the printed circuit board is detachable from the bottom tray by pressing the protrusions toward the bottom wall and releasing the printed circuit board from the blocking members.

11. A liquid crystal display comprising:
a printed circuit board defining a plurality of through holes therein; and
a bottom tray comprising:
a bottom wall;
a plurality of deformable fixing members inseparably formed with the bottom wall, each deformable fixing member comprising a deformable portion and a protrusion protruding from the deformable portion; and
a plurality of blocking members inseparably formed with the bottom wall, each blocking member comprising a location tab opposite to the bottom wall and spaced from the bottom wall a predetermined distance so as to define a space between the location tab and the bottom wall;
wherein when edge portions of the printed circuit board are inserted into the spaces, the location tabs and the deformable fixing members respectively abut two opposite surfaces of the printed circuit board, and the deformable portions deform toward the bottom wall, and when the through holes of the printed circuit board become aligned with the protrusions, the deformable portions rebound and the protrusion of each deformable fixing member extends through a respective one of the through holes of the printed circuit board such that the printed circuit board is stopped by the protrusions of the deformable fixing members and the printed circuit board is secured to the bottom wall by the cooperation of the deformable fixing members and the blocking members.

12. The liquid crystal display as claimed in claim 11, wherein the plurality of deformable fixing members and the plurality of blocking members outwardly extend from the bottom wall.

13. The liquid crystal display as claimed in claim 11, wherein an arrangement of the plurality of blocking members corresponds to a shape of the printed circuit board at the edge portions thereof.

14. The liquid crystal display as claimed in claim 11, wherein the deformable portion of each deformable fixing member comprises a first plate, two second plates, and two third plates, the second plates being respectively arranged at two opposite sides of the first plate, and each third plate interconnecting the first plate and a respective one of the second plates.

15. The liquid crystal display as claimed in claim 14, wherein the second plates are parallel to the first plate, and the third plates are inclined relative to the first plate and the second plates.

16. The liquid crystal display as claimed in claim 14, wherein the protrusion of each deformable fixing member extends from the first plate in a direction away from the second plates.

17. The liquid crystal display as claimed in claim 14, wherein the first plate, the second plates, the third plates, and the protrusion of each deformable fixing member are inseparably formed together.

18. The liquid crystal display as claimed in claim 11, wherein the printed circuit board is detachable from the bottom tray by pressing the protrusions toward the bottom wall and releasing the printed circuit board from the blocking members.

19. A liquid crystal display comprising:
a printed circuit board defining at least one through hole therein; and
a bottom tray comprising:
a bottom wall;
at least one deformable fixing member inseparably formed with the bottom wall, each of the at least one deformable fixing member comprising a deformable portion and a protrusion protruding from the deformable portion; and
at least one blocking member inseparably formed with the bottom wall, each of the at least one blocking member comprising a location tab opposite to the bottom wall and spaced from the bottom wall a predetermined distance so as to define a space between the location tab and the bottom wall;
wherein when edge portions of the printed circuit board are inserted into the space, the location tab of the at least one blocking member and the at least one deformable fixing member respectively abut two opposite surfaces of the printed circuit board, and the deformable portion deforms toward the bottom wall, and when the at least one through hole of the printed circuit board becomes aligned with the protrusion of the at least one deformable fixing member, the deformable portion rebounds and the protrusion of the at least one deformable fixing member extends through the at least one through hole of the printed circuit board such that the printed circuit board is stopped by the protrusion of the at least one deformable fixing member and the printed circuit board is secured to the bottom wall by the cooperation of the at least one deformable fixing member and the at least one blocking member.

20. The liquid crystal display as claimed in claim 19, wherein the deformable portion of the at least one deformable fixing member comprises a first plate, two second plates, and two third plates, the second plates being respectively arranged at two opposite sides of the first plate, and each third plate interconnecting the first plate and a respective one of the second plates.

* * * * *